Patented Feb. 6, 1951

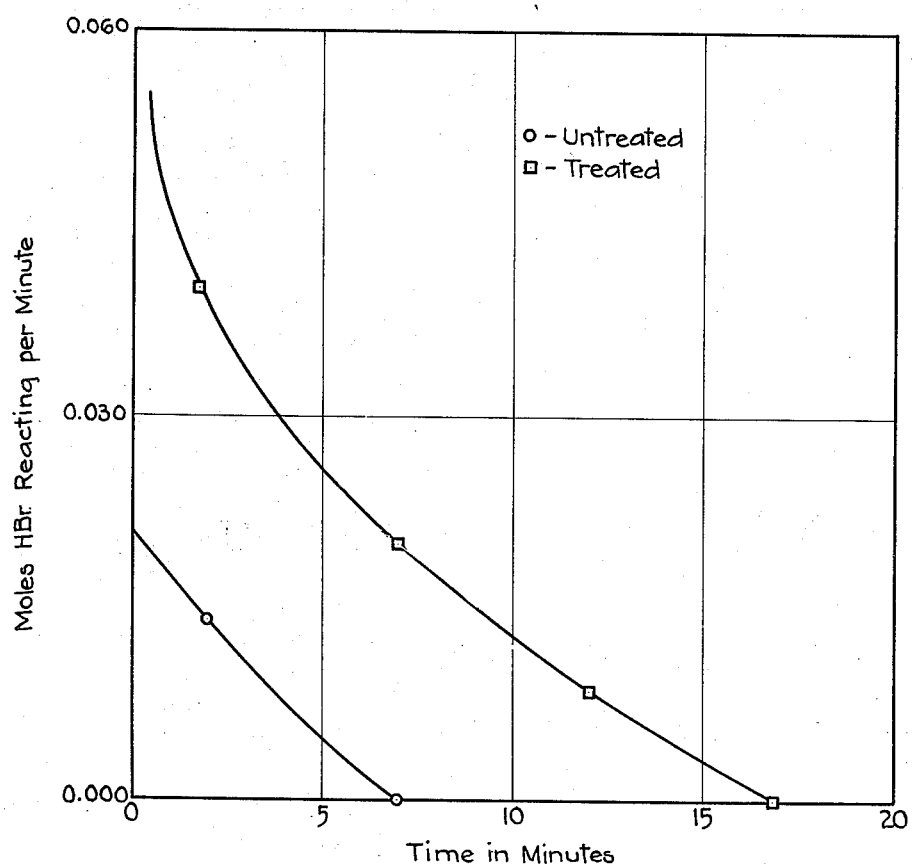
Fig. I

2,540,126

UNITED STATES PATENT OFFICE 2,540,126

PHOTOCHEMICAL HYDROBROMINATION OF OLEFINS

Antoine E. Lacomblé, San Francisco, and Denham Harman and William E. Vaughan, Berkeley, Calif., assignors to Shell Development Company, San Francisco, Calif., a corporation of Delaware Application June 21, 1946, Serial No. 678,284

2 Claims. (Cl. 204—163)

The present invention relates to an improved method of reacting hydrogen halides with unsaturated organic compounds. More particularly, the invention relates to an improvement in the light catalyzed reaction of hydrogen halides with unsaturated organic compounds whereby certain substances are removed from the unsaturate which, when present, interfere with the reaction by filtering out the actinic light.

It is well known that hydrogen halides may be added to unsaturated hydrocarbons, and various unsaturated derivatives of such hydrocarbons. If, in the case of asymmetrical hydrocarbons, the addition of the halogen takes place on the carbon atom having the fewer hydrogen atoms, the addition is known as "normal" or "Markownikoff," while if the addition takes place on the carbon atom having the more hydrogen atoms, the addition is known as "abnormal" or "anti-Markownikoff." The hydrogen atom of the hydrogen halide molecule attaches to the adjacent unsaturated carbon atom. In the case of unsaturated molecules which already contain a halogen atom or atoms attached to an unsaturated carbon atom, the "normal" addition is the one in which the halogen atom of the hydrogen halide becomes attached to the carbon atom which already contains the largest number of halogen atoms. The opposite situation is known as the "abnormal" addition. This invention relates to the abnormal addition of hydrogen halides to unsaturated organic compounds.

The patent of William E. Vaughan and Frederick F. Rust, 2,307,552, teaches a method of directing the halogen atom to combine with an unsaturated organic compound in the abnormal manner by catalyzing the reaction with actinic light having a wave length below about 2900 to 3000 A. U. (angstrom units). This process has been found to work well with relatively pure unsaturated compounds and particularly with those having a low molecular weight. However, we have now found that in attempting to apply the process to high molecular weight mixtures containing unsaturated compounds, particularly those produced by cracking waxes, the reaction does not proceed with the desired rapidity.

Several factors might contribute to this decrease in reactivity. Some diminution in reactivity might be expected as a consequence of the "steric factor," i. e., the necessity for definite orientation of the olefin at the time of approach of a halogen atom in order that a fruitful collision be made to form a halogen substituted olefin. The more complex the olefin, the more specific must be the orientation. Further, it has been found that as the olefin molecule increases in length, the absorption of the actinic radiation increases somewhat. However, it has been found that the decrease in reactivity of the high molecular weight mixtures was too great to be accounted for by steric hindrance or increased light absorption by the olefin.

This is borne out by experiments in which the reactivities of pure olefins (prepared from allyl chloride and the appropriate Grignard reagents) were compared. In these experiments, equal volumes of one molar solutions of pure 1-octene and 1-tridecene in iso-octane were sealed in separate transparent tubes along with equivalent amounts of hydrogen bromide. The tubes were illuminated with ultraviolet light under identical conditions for a short period of time. Iso-octane was used as a solvent because it is transparent to the radiations capable of dissociating hydrogen bromide. After illumination, the tubes were cooled in liquid nitrogen, opened, and the extent of the reaction determined by titration of the unreacted hydrogen bromide. It was found that the 1-octene had reacted only 10–20% faster than the 1-tridecene. However, as will be further explained in the examples given hereinafter, when a "commercial" sample of 1-tetradecene distilled from a mixture of cracked wax olefins, in which the olefins consisted exclusively of 1-olefins, was treated with hydrogen bromide as in the foregoing example, less than 10% of the desired reaction occurred. Hence, in the light of this experiment and the foregoing one with pure tridecene, it can reasonably be concluded that the relative non-reactivity of commercial olefin fractions is due to the presence of inhibiting impurities.

This invention is not predicated on any theory of operation, but it is believed that the suspected impurities act as a light filter and inhibit the reaction and that they are compounds having boiling points so near to that of the olefin that they cannot be readily separated from the olefin by fractionation.

We have now found that by appropriately treating the olefin mixture, the reaction inhibiting compounds may be removed. This may be done by contacting the impure olefin with a selective solvent or with a selective adsorptive agent, i. e., with a contact agent having a high affinity for materials which act as light filters blocking the passage of light of short wave lengths.

Figure 1 illustrates a graphic representation wherein an olefin mixture treated in accordance with the process of this invention is compared to an untreated olefin mixture with respect to moles of HBr reacting per minute.

Among selective solvents which may be used are liquid sulfur dioxide, furfural, dimethyl sulfolane, phenol, propane-cresylic acid mixture (commercially known as the Duo-Sol process), chlorex ($\beta,\beta'$-dichloroethyl ether) and the like. Some of the solvents such as sulfur dioxide and furfural have a strong absorption for actinic radiation, so that if such solvents are used it is important that substantially all of the solvent be removed from the olefin. Of the solvents listed, sulfur dioxide and furfural are preferred. Extraction with the solvent may be done either batchwise or continuously in a countercurrent extractor such as is well known in the art of refining petroleum products. The extent of such treatment will depend upon the quantity of inhibitors present in the olefin under consideration. Olefins from different sources will vary considerably in their impurity content so that it is impossible to specify an exact treatment. However, the extraction should be continued until the desired improvement (as hereinafter defined) in light transmission has been achieved. Generally speaking, it has been found that if an olefin is contacted successively six times with an equal volume of fresh selective solvent, the actinic light transmission will be satisfactory for photohydrohalogenation.

Silica gel has been found to be a very effective adsorptive agent in removing the impurities, although other known adsorptive agents such as activated charcoal, kaolin, diatomaceous earth, aluminum hydroxide or oxide, burned magnesium oxide, zeolite or the like may be used. When silica gel is used it has been found effective to pack a column with the gel and to allow the olefin to pass through it. Here again, the treatment should be continued until the desired improvement in actinic light transmission is obtained. The silica gel may be regenerated by washing with methyl or ethyl alcohol and used repeatedly. If the various clays are used the olefin may be agitated with the clay either batchwise or continuously followed with removal of the clay by means of a filter press.

Hereinafter reference will be frequently made to the absorption limit of various olefins and mixtures. This absorption limit may be defined as the wave length at which a 1 cm. depth of the olefin has an optical density of 0.4. Thus if the absorption limit of an olefin is said to be 2900 A. U., a 1 cm. layer has an optical density of 0.4 to light having a wave length of 2900 A. U. and would have a greater optical density for light of shorter wave length or higher frequency.

In the Vaughan and Rust Patent, 2,307,552, it is disclosed that the light used in catalyzing the reaction should have a wave length of below about 3000 A. U. In the present invention it is preferred to treat the olefin so that the absorption limit is 3000 A. U. or below. However, since the absorption limit does not represent an absolute cut-off but only a rather abrupt reduction in transmission, the olefins may be treated to have an absorptive limit as high as 3200 A. U.

The present invention may be utilized to treat any olefins or derivatives thereof. It has been found that the lower olefins, having less than 9 carbon atoms, may ordinarily be hydrohalogenated without treatment to remove aromatic inhibiting compounds. Nevertheless, such compounds may be treated according to the present invention if they contain contaminates which lower the actinic light transmission. The invention is primarily applicable to olefin mixtures which have been produced by the cracking of hydrocarbon molecules by thermal or catalytic means. The cracked hydrocarbons containing olefins may be fractionated into narrow cuts, each of which contains molecules of substantially the same molecular weight or the mixture of olefins produced may be hydrohalogenated in accordance with this invention. A particularly valuable subclass of olefins consists of the olefins having only a single double bond in the 1 position. According to the present invention, such compounds by abnormal addition yield alpha substituted halides which may be used as such or which may be used as intermediates in the production of still further compounds. For instance, the 1-halo-substituted hydrocarbons may be readily hydrolyzed to form normal alcohols.

The hydrohalogenation of the olefins under the influence of ultra-violet light may be effected in the vapor or liquid phase or in a two-phase liquid-vapor system. Inasmuch as the present invention is primarily applicable to hydrocarbons of relatively high molecular weight, it is ordinarily preferred to perform the hydrohalogenation in the liquid phase. Since the abnormal addition of the hydrogen halides according to the present invention occurs photo-chemically, no heating is necessary. In fact, in many instances the reaction, although it may be effected at temperature of about 25° C., is preferably effected at temperatures which are even below 0° C. Inasmuch as the reaction is highly exothermic, suitable means for cooling the reactor should be provided. Also it has been discovered that the abnormal addition of hydrogen halides, when the reaction is effected under the influence of ultra-violet radiations, proceeds regardless of the presence or absence of a liquid film in the reaction zone.

The following examples illustrate the beneficial effects obtained in hydrohalogenation according to the present invention.

*Example I*

A normally-liquid fraction of the olefins produced by cracking Balik-Papan wax, the fraction comprising predominantly olefins containing 14 carbon atoms, and boiling at 196° C. and under 19 mm. mercury pressure, was used as the starting material. The sample was divided into two 100 cc. portions and one was allowed to percolate through a column (14 x 2.5 cm.) of silica gel. The untreated sample had a refractive index of $n_D^{20}=1.4545$ and an adsorption limit of 4050 A. U. The treated sample had a refractive index of 1.4392 and an absorption limit of 2960 A. U. The samples were then put in reactors and were chilled at 0° C. and hydrogen bromide was passed through the sample. The results are shown by Figure 1. It may be seen that the initial rates show some similarity, but that the rate of reaction of the untreated sample falls off very rapidly. More than 90% of the silica gel-treated material was converted to normal tetradecyl bromide, whereas during the same period less than 10% of the untreated sample was converted.

The reactor used in the above experiments consisted of a 3 liter flask surrounded by an ice-salt bath. Near the bottom of the flask was a sintered glass bubbler for the introduction of the hydrogen bromide, and directly above the bubbler was suspended a 100 watt quartz mercury arc lamp in a clear quartz envelope. The flask was provided with a condenser cooled to Dry Ice temperature and the effluent hydrogen bromide was collected in a water trap.

*Example II*

Another portion of the $C_{14}$ cracked wax olefin fraction described in Example I was extracted six successive times with volumes of liquid sulfur dioxide equal to that of the olefin. After such treatment the $C_{14}$ fraction's refractive index and absorption limit were reduced from 1.4545 and 4050 A. U. to 1.4392 and 3200 A. U. The treated olefin could be readily photohydrohalogenated whereas the untreated olefin did not transmit actinic light sufficiently well to permit the reaction to take place readily. It has also been found that similar improvements in light transmitting ability may be achieved with furfural and dimethylsulfolane.

In some instances it may be desirable to conduct the hydrohalogenation in the presence of solvents. The solvent selected should be one which is inert to hydrogen halides and which is transparent to ultraviolet radiation. For this purpose the normally liquid, hydrocarbons such as heptane, iso-octane and nonane are preferred.

Although the above experiments were conducted with hydrogen bromide, it is to be understood that the invention is applicable to the abnormal addition of the other hydrogen halides such as hydrogen chloride, hydrogen iodide and/or hydrogen fluoride. However, the invention is particularly applicable to the abnormal addition of hydrogen bromide.

We claim as our invention:

1. In a process for producing alkyl bromides, wherein petroleum wax is subjected to a cracking treatment productive of normally liquid 1-olefins and a separated fraction of the products of the cracking treatment comprising normally liquid 1-olefins of substantially the same carbon content and having at least 9 carbon atoms, is hydrobrominated by reaction with hydrogen bromide under the deliberately applied action of actinic light, the improvement which comprises the steps of contacting said separated fraction prior to hydrobromination thereof with silica gel until said fraction has a light absorption limit of less than about 3000 angstrom units and then hydrobrominating the thus treated separated fraction by reaction with hydrogen bromide under the deliberately applied action of ultraviolet light having a wave length below about 3000 angstrom units.

2. In a process for producing alkyl bromides, wherein petroleum wax is subjected to a cracking treatment productive of normally liquid 1-olefins and a separated fraction of the products of the cracking treatment comprising normally liquid 1-olefins of substantially the same carbon content and having at least 9 carbon atoms, is hydrobrominated by reaction with hydrogen bromide under the deliberately applied action of actinic light, the improvement which comprises the steps of contacting said separated fraction prior to hydrobromination thereof with a solid adsorption agent until said fraction has a light absorption limit of less than about 3000 angstrom units and then hydrobrominating the thus treated separated fraction by reaction with hydrogen bromide under the deliberately applied action of ultraviolet light having a wave length below about 3000 angstrom units.

ANTOINE E. LACOMBLÉ.
DENHAM HARMAN.
WILLIAM E. VAUGHAN.

REFERENCES CITED

The following references are of record in the file of this patent:

UNITED STATES PATENTS

| Number | Name | Date |
|---|---|---|
| 1,959,346 | Cummins | May 22, 1934 |
| 1,960,698 | Dietrich | May 29, 1934 |
| 2,307,552 | Vaughan et al. | Jan. 5, 1943 |
| 2,384,378 | Hooker et al. | Sept. 4, 1945 |
| 2,386,523 | Welling | Oct. 9, 1945 |